United States Patent Office — 3,013,997 — Patented Dec. 19, 1961

3,013,997
ALKANOL AMINE CARBOXYLIC ACID REACTION PRODUCT AND RESINS DESTATICIZED THEREWITH
Myron A. Coler, 56 Secor Road, Scarsdale, N.Y.; Janice A. Cutler, New York, N.Y. (25—14 31st Ave., Long Island City, N.Y.); and Arnold S. Louis, Riverdale, N.Y. (87 Southgate Ave., Hastings-on-Hudson, N.Y.)
No Drawing. Filed Aug. 19, 1957, Ser. No. 679,098
20 Claims. (Cl. 260—23)

This invention relates to improved molding compositions, and is herein illustrated in some detail as embodied in polystyrene based synthetic resin molding compositions which are antistatic, that is to say that they are not subject to the highly undesirable effects of electrostatic charge build-up during the usual molding ejection operations. This invention also relates to suitable additives for such compositions and to the process of making antistatic moldings.

Extensive laboratory and field tests involving manufacturers, molders and users point to electrostatic patterns produced at the time of molding ejection as the main source of the long recognized static dust pickup problem of ordinary polystyrenes.

The electrostatic field appears to be distributed in three dimensions throughout the molding so that conventional surface treatments not only require an extra operation but are of limited value.

Although the electrostatic field attenuates with time, it is capable of persisting for many months so that the vendor or user may be plagued with dust collection problems originating at the time of molding long after the molding operation and despite interim use of protective wrappings.

Moldings are apt to appear particularly "dirty" due to the fact that static dust pickup rarely occurs uniformly. The pickup tends to be strongest over regions of thin cross-section and high curvature and in recessed areas which are particularly hard to reach and clean. Even on flat areas, characteristic and especially objectionable fern-like and branched patterns of pickup are prevalent. The chief source of dirt is the atmosphere. Since electrostatic attraction leads to electrostatic retention, the pickup dust tends to be far more adherent than that which any surface will gather under simple gravity settling. A symmetric polystyrene molding suspended in the air will collect and retain substantially the same amount of dust pattern on its under surface as on its top surface.

Several measurable phenomena have been used as criteria of a material's tendency to receive and maintain an electrostatic charge; among these are:

(1) Surface resistivity
(2) Volume resistivity
(3) Ash and synthetic dust pickup after rubbing
(4) Electrometer readings after rubbing
(5) Electrometer readings after molding
(6) Synthetic dust pickup after molding For materials of relatively low specific resistance (e.g., $10^6$ ohm-cm.), fair direct correlations of the above factors and the charge generation and maintenance may be secured. However, for the much more resistive destaticized polystyrenes of present interest (5) and (6) only of the above group show correlation with atmospheric dust pickup after molding—the prime concern. The correlation with (5) is fairly indicative. With some allowance for variations in "atmospheric dust," excellent practical correlation has been secured between actual long term exposure behavior and extremely short test runs under (6) employing lampblack in an atomizing gun.

Much effort has been lost by workers in the field in seeking direct correlation between destaticizing capabilities during molding and factors (1)–(4). Many materials for which destaticizing properties have been claimed have proven inadequate in actual practice. Despite a superficial descriptive simplicity, rubbing induced static effects are probably more uncertain in effect than those induced under molding conditions. There can be very complex and capricious side effects depending upon the material and conditions of the rubbing medium, mechanics and orientation of the rubbing motion and other conditions. More specifically, it may be noted that molded synthetic resin formulations have been prepared which show up well on rubbing tests but fail on the really import atmospheric exposure tests. Also, dust accumulation induced by rubbing tends to be of the smudge or speck type rather than the more objectionable branched pattern type. Moreover, the use of destaticizing agents which provide good rub behavior by virtue of a hygroscopic film may result in stubborn retention of atmospheric dirt by simple adhesive action.

In the present work, destaticizing effectiveness has been gauged by the above indicated atmospheric exposure tests and the atomized dust technique applied to specimens at various times after molding.

As will be disclosed hereinafter, if the teachings of this invention are observed then the undesired dust collecting effects of electrostatic charging of a synthetic resin article during a molding operation can be avoided.

A feature of this invention is the provision of destaticized synthetic resin molding compositions of high color stability.

In particular, this invention provides destaticized polystyrene based resin compositions characterized by a high degree of color stability.

Among the other advantages of this invention is the provision of a simple method for molding destaticized plastic articles.

Still other features of this invention include the provision of a destaticized resin composition utilizing a synergistic agent for rendering a destaticizing agent effective in relatively small quantities.

One aspect of this invention provides a new class of useful compositions useful in molding procedure.

It has been found that after combining selected alkanolamines, such as triisopropanolamine with selected carboxylic acids, the resulting product confers extremely desirable antistatic properties when incorporated in synthetic resin formulations. It has been disclosed in the copending application of Myron A. Coler and Arnold S. Louis entitled, "Non-Electrostatic Molding Compositions," Serial No. 574,957, filed March 30, 1956, which issued as U.S. Patent 2,931,783 on April 5, 1960, that synthetic resin compositions need to contain at least 3% by weight of the resin of triisopropanolamine with, for example, polystyrene to provide adequate destaticization. We have found that by reacting the triisopropanolamine with selected carboxylic acids such as pelargonic acid in approximately equi-molar ratios, while cooling the reacting materials to prevent overheating, a product is formed, 2% of which proves to be a better additive in terms of destaticization than 3% of the triisopropanolamine used above. A smaller quantity of additive is preferred since less lowering of the heat distortion point of the resin results. Perhaps of even greater significance is the finding that if the 2% of additive contains 80 parts of the triisopropanolamine and only 20 parts of the aforementioned product, it is still superior in effect to 3% by weight of the triisopropanolamine used alone.

The incorporation of the carboxylic acid results in a clearly synergistic effect. In carrying out laboratory investigations of the triisopropanolamine as a destaticizing agent, it was found that a trace of pelargonic acid introduced by contaminated equipment such as the extruder or mold was sufficient to result unexpectedly in a destaticized composition.

It is possible to obtain temporary destaticizing effects by coating the mold faces of an injection mold with the destaticizing additives disclosed herein. The coating may be conveniently applied by spraying.

One form of a destaticized plastic composition contains as an additive approximately equi-molar quantities of the alkanolamine and a carboxylic acid. We have found that a range of compositions containing in the additive an excess of one ingredient over the equimolar quantity may also be advantageously employed.

Based on an additive concentration of 2% by weight of synthetic resin in the molding composition, additives containing as much as about 99.5 mole percent of free alkanolamine or 84 mole percent of free carboxylic acid may be used. By "free" is meant the quantity of the substance present in excess of the quantity calculated to combine equi-molecularly with the other constituent.

Specifically in terms of weight percent, additives containing as much as 99.5% by weight, free triisopropanolamine or 70% by weight, free pelargonic acid may be used. By this is meant, in the first instance, that the reaction mixture contains 1% by weight, of the equimolar mixture and 99% by weight, of additional triisopropanolamine.

If a larger quantity of triisopropanolamine additive, say 3 or 4% by weight of the synthetic resin in the total molding composition is employed, a trace of the organic acid may be adequate.

The polystyrene based synthetic resins named seem typical of copolymers and mixtures of polymers and copolymers of styrene; and polymers, copolymers and mixtures of polymers and copolymers of modified styrenes, such as methyl styrene, in any of which styrene or modified styrene is present in a major portion, and also molding compositions of the above containing additives which act as colorant, lubricants, stabilizers, or may be useful in other ways.

Examples of the above are styrene-butadiene copolymers, and styrene-acrylonitrile copolymers. An example of a polymer mixture, otherwise known as a styrene alloy, is a polymer mixture containing polystyrene, polybutadiene and polyacrylonitrile.

Carboxylic acids suitable for the purposes of this invention include both the mono-carboxylic acids represented by the formula R—COOH wherein R is a monovalent aliphatic radical and the acid is one having from 2 to 18 carbon atoms in the molecule and di-carboxylic acids which may be represented by the formula

COOH—R'—COOH wherein R' is a divalent aliphatic radical and the acid is one having from 4 to 18 carbon atoms in the molecule. The most satisfactory carboxylic acids are the mono-carboxylic acids having from 6 to 12 carbon atoms in the molecule. Pelargonic acid with 9 carbons has been discovered to be distinctly superior.

Many alkanolamines such as the mono-, di-, and tri-alkanolamines, including primary, secondary, and tertiary amino nitrogens have proved useful. In the case of the secondary and tertiary alkanol amines, alkyl groups may be present.

Suitable alkanolamines may be represented by the general formula

wherein R represents a monoalkanol group and R' and R" each represent hydrogen, alkyl or monoalkanol groups.

In the above formula alkyl and alkanol groups contain from 1–8 carbon atoms. Preferred alkanolamines are those containing 2–4 carbon atoms in the alkyl and alkanol groups.

The sum of the carbon atoms in the alkyl and alkanol groups of the above alkanolamines preferably should be in the range of 6–12.

The reaction between the carboxylic acids and the alkanolamines is exothermic. Since an increase in temperature appears to result in undesirable side reactions, it is important that the reaction mixture not be permitted to become too hot. It has been found adequate, for example, to maintain the temperature below 65° C.

The reaction has usually been performed in the laboratory by liquefying, e.g., triisopropanolamine by warming it in a beaker, placing the beaker in a cold water bath and agitating its contents. The cold water bath is so regulated as not to permit the triisopropanolamine to refreeze before the acid is added. The acid is added slowly as a liquid or finely divided solid to the triisopropanolamine, care being exercised that the temperature be maintained under 50° C. If desired, the amine may be added to liquid carboxylic acids with similar precautions.

While it is not definitely known what are the products resulting from the reaction carried out in the above fashion, it seems that alkanolammonium carboxylate salts are a considerable part of the product. Conditions should be chosen under which the occurrence of undesirable side reactions is discouraged, that is, higher reaction temperature should be avoided. Higher temperatures have resulted in a discoloration or darkening of the material rendering it unsuitable for use in clear and light colored molding compositions.

By incorporating the above mentioned additives or mixtures thereof in polystyrene, the destaticizing properties are attained without incurring any undesirable degradation of the resin. The quantity of additive employed is between 0.5% and 10% by weight, based on the total product and preferably between 1 and 4%. The upper limit is a matter of choice dictated by considerations of economy and effect on the heat distortion point but is in general not critical.

For example, 15% or more may be used and the desired destaticizing results obtained, although at such high concentrations there is danger of affecting physical properties of the final product adversely.

Be it observed that it will often be advantageous to prepare a masterbatch of resin with incorporated additive, said masterbatch containing as much as 33% additive which is far more additive than is recommended for use in molding operations. The concentration is later reduced by incorporating untreated resin as by extrusion or by other blending methods. Such a concentrate may well be sold, particularly in the "clear" or "natural" color for blending with untreated resin of various colors or its own color.

By way of illustration, there are given hereinafter a number of examples wherein the additive, quantity of additive and the resinous polymer employed are varied. Since innumerable combinations are possible, it becomes impractical to show more than a few typical compositions with additives so selected from the described group as to show operability of the group as a whole.

A suitable method of incorporation is to introduce the alkanolamine constituent of the destaticizing agent into the resin as by polymerizing the resin monomer in the presence of the alkanolamine or the alkanolamine may be incorporated into the resin polymer by means of an extruder or other suitable apparatus. Following either preliminary procedure the polymer is comminuted into molding granules. One method of accomplishing this is to extrude strands of resin, say ⅛" square and chop the strands so as to form ⅛" pellets. The pellets may then be coated with the equi-molar combination of the alkanolamine and carboxylic acid. Optionally, the alkanolamine-acid may be dispersed in an excess of the alkanolamine, an excess of the acid, or even the customary mold release agent frequently coated onto molding pellets to expedite the ejection of the molded article upon completion of the molding cycle.

This procedure is advantageous since it tends to minimize the undesired side effects which may result from heating of the equi-molar product during polymerization or extrusion.

The procedure of Example 1 may be employed for commercial production and may be preferred, in some instances, for its simplicity and freedom from extra drying steps.

EXAMPLE 1

A 3 gram-mole quantity of triisopropanolamine was measured into a beaker and then agitated by a high speed mechanical stirrer while there was gradually added to it a 3 gram-mole quantity of pelargonic acid. Mixing was done with the beaker immersed in a cold water bath. Temperature of the triisopropanolamine-acid was maintained below 50° C. A laboratory size batch was made by incorporating 10 grams of the resulting material into 500 grams of standard polystyrene by means of a sigma blade mixer. Actually employed was Monsanto Chemical Company "Hi Flow 77 L2020-106" polystyrene plus an additive of white pigment, in this case 1.25 grams $TiO_2$ ("du Pont R-610," E. I. du Pont de Nemours & Company) per pound of polystyrene, which was incorporated by means of a sigma blade mixer. Ten such batches were then combined and extruded at the rate of 40 pounds per hour in a Windsor type RC-65 twin screw extruder. Temperatures of the front and rear barrel were held at 400° F. while the temperature of the die was held at 375° F. The extruder was equipped with a "Syntron" vibratory feed hopper.

Various moldings were made on standard commercial injection molding machines using standard polystyrene molding conditions. Moldings varied from 1 inch discs to 10 inch plates and included intricate shapes and designs.

Testing (1) Measurements of the electrostatic charge were made using a Keithley Electrostatic Voltmeter immediately upon removal of the above moldings from the mold. The potential was found to be less than 2 negative volts which was low enough not to attract dust. A comparison molding made from untreated polystyrene showed a voltage reading of over 20 volts (negative).

(2) Specimens of the newly molded destaticized moldings and unmodified polystyrene moldings were sprayed with carbon black from a household type insecticide sprayer at a distance of four feet. The unmodified control showed definite dust attraction in heavy branched fern-like patterns. The destaticized plastic molding showed merely random dust particles that had landed directly; this was rated as excellent.

The specimens were rated as follows:

Excellent—Clean appearance of specimen; no attracted dust apparent
Good—Faint smudge over small area of molding
Fair—Faint appearance of a light smudge, fairly uniform over molding
Unsatisfactory—Heavy smudge and/or branching (fern-like deposit)

Example 2 is a control test of polystyrene composition containing 2% triisopropanolamine without any added acid.

Examples 3 through 14 represent a study of the variation of the acid constituent employing in all cases the same alkanolamine. Additive A represents triisopropanolamine; additive B is the equi-molar reaction product of the listed acid and triisopropanolamine. The method of incorporation and the test procedure correspond to Example 1. The same polystyrene as used in Example 1 was employed except for Examples 5, 7 and 9 where the following materials were substituted:

Example 5—25% acrylonitrile, 75% styrene (copolymerized).
Example 7—Polydichlorostyrene.
Example 9—10% butadiene, 90% styrene (copolymerized).

| Example | Total additive, Percent | A, Percent | Alkyl carboxylic acid | B, Percent | Voltmeter | Dust |
|---|---|---|---|---|---|---|
| 2 | 2 | 100 | None | 0 | −15 | Unsatisfactory. |
| 3 | 2 | 80 | Acetic acid-$CH_3COOH$ | 20 | −2 | Fair. |
| 4 | 2 | 80 | Propionic acid $C_2H_5COOH$ | 20 | −0.9 | Fair-good. |
| 5 | 2 | 80 | n-Caproic acid $CH_3(CH_2)_4COOH$ | 20 | −1 | Good. |
| 6 | 2 | 0 | Heptanoic acid $C_6H_{13}COOH$ | 100 | −2 | Do. |
| 7 | 2 | 0 | Octanoic acid $C_7H_{15}COOH$ | 100 | −0.5 | Do. |
| 8 | 2 | 80 | Pelargonic acid $C_8H_{17}COOH$ | 20 | −1 | Excellent. |
| 9 | 2 | 80 | Undecylenic acid $H_2C=CH-C_8H_{16}COOH$ | 20 | −0.5 | Good-excellent. |
| 10 | 2 | 80 | Lauric acid $C_{11}H_{23}COOH$ | 20 | −1 | Good. |
| 11 | 2 | 90 | Oleic acid $C_8H_{17}CH=CH-C_7H_{14}COOH$ | 10 | −2 | Fair. |
| 12 | 2 | 0 | ...do | 100 | −0.5 | Good. |
| 13 | 2 | 80 | Stearic acids $C_{17}H_{35}COOH$ | 20 | −0.6 | Fair-good. |
| 14 | 2 | 80 | Azelaic acid $(HOOC)C_7H_{14}(COOH)$ (dispersion formed in a "Waring Blendor"). | 20 | −3 | Fair. |

In Examples 15 through 22, the alkanolamine (triisopropanolamine) and the acid (pelargonic) are the same in all cases. The ratio of additive to resin is varied in some instances, while the ratio of the equi-molecular product to alkanolamine is varied in still other examples.

The softening point of the moldings was measured in the cases of Examples 2, 4, 8, 9 and 12 and no significant lowering was observed of the latter four as compared to the control, Example 2.

| Ex. | Total additive, percent | A, percent | Alkyl carboxylic acid | B, percent | Voltmeter | Dust |
|---|---|---|---|---|---|---|
| 15 | 1.5 | | Pelargonic acid $C_8H_{17}COOH$. | 100 | ±0.2 | Excel. |
| 16 | 2 | 99.5 | ...do | 0.5 | −10 | Fair. |
| 17 | 2 | 99 | ...do | 1 | −5 | Good. |
| 18 | 2 | 97.5 | ...do | 2.5 | −2 | Good-excel. |
| 19 | 2 | 95 | ...do | 5 | −1.2 | Do. |
| 20 | 1.5 | 90 | ...do | 10 | −1.0 | Excellent. |
| 21 | 1.5 | 80 | ...do | 20 | −0.4 | Do. |
| 22 | 1 | 80 | ...do | 20 | −2 | Do. |

In the following examples the procedure of Example 1 was repeated using the equi-molar reaction product of pelargonic acid and triisopropanolamine, and pelargonic acid in various proportions. In the following examples, no free triisopropanolamine was employed.

| Example | Percent additive | Percent free pelargonic acid | Percent equimolar product | Voltmeter | Dust |
|---|---|---|---|---|---|
| 23 | 2 | 50 | 50 | −0.2 | Excellent. |
| 24 | 2 | 65 | 35 | ±0.2 | Do. |
| 25 | 2 | 80 | 20 | −3 | Unsatis. |

In the Examples 26 through 31 the procedure of Example 1 was repeated using 2% total additive in all cases but varying the alkanolamine (A) and acid constituents as shown. (B) is the substantially equi-molar product of the alkanolamine and an acid.

| Ex. | A (alkanolamine) | Percent free A | B | Percent B | Voltmeter | Dust |
|---|---|---|---|---|---|---|
| 26 | Dimethyl isopropanolamine | 80 | Pelargonic acid: dimethyl isopropanolamine. | 20 | −1 | Fair. |
| 27 | do | 80 | Pelargonic acid: triisopropanolamine. | 20 | ±1 | Do. |
| 28 | Triisopropanolamine | 80 | Pelargonic acid: triethanolamine. | 20 | ±0.2 | Good. |
| 29 | None | 0 | Oleic acid: Triethanolamine. | 100 | −0.5 | Fair. |
| 30 | N-butyl diethanolamine | 80 | Pelargonic acid: N-butyl diethanolamine. | 20 | ±0.1 | Excel. |
| 31 | None | 0 | Pelargonic acid: diisopropanolamine. | 100 | ±1 | Good. |

EXAMPLE 32

15 grams of the product of equi-molar quantities of triisopropanolamine and pelargonic acid dissolved in 60 grams of water, were incorporated into 666 grams of polystyrene emulsion containing 30% polystyrene solids.

785 grams of granulated polystyrene were placed in a sigma blade mixer. With the mixer in operation, the polystyrene emulsion additive mixture was slowly added. The resultant slurry was then dried at 65° C. for 58 hours. The resultant mixture which contained 6% of the additive, when molded as in Example 1, yielded moldings which, when tested as in Example 1, were rated as excellent.

EXAMPLE 33

20 grams of the composition formed from combining equimolar quantities of triisopropanolamine and pelargonic acid were added to 540 grams of a 30% solid polystyrene emulsion. This mixture was spray-dried and yielded a polystyrene powder containing one part of the additive to three parts of polystyrene. The resultant concentrate was tumbled with 800 grams of a granulated polystyrene. The resultant blend was injection molded under conventional polystyrene molding conditions and yielded destaticized moldings having properties comparable to those produced by the procedures of Example 1.

EXAMPLE 34

0.6 gram of α,α,azodiisobutyronitrile was dissolved in 240 grams of monomeric styrene along with 20 grams of the reaction product of equi-molar quantities of triisopropanolamine and pelargonic acid. The solution was placed in a heated agitated reaction kettle into which nitrogen was bubbled. The styrene solution was heated at 70° C. for 1½ hours until an exothermic reaction took place. The reaction was continued for an additional 30 minutes with the temperature being gradually increased to 90° C. for 48 hours. The resultant polymer was extruded and chopped into granules. 260 grams of the granules were then mixed with 740 grams of untreated polystyrene, extruded, chopped and injection molded under normal polystyrene molding conditions. Moldings were clean after subjection to the dust test.

EXAMPLE 35

2.0 grams of α,α, azodiisobutyronitrile was dissolved in 800 grams of monomeric styrene together wtih 38 grams of triisopropanolamine and the solution was placed in a heated agitated reaction kettle into which nitrogen was bubbled. The suspension was heated at 70° C. for 1½ hours until an exothermic reaction took place. The reaction was continued for an additional 30 minutes with the temperature being gradually increased to 90° C. Considerable polymerization took place as evidenced by an increase in viscosity. The mixture was transferred to airfree containers which were then sealed. The containers were held at 90° C. for 48 hours. The resultant polymer was extruded and chopped into granules. 1 gram of the combination of equimolar triisopropanolamine and pelargonic acid were mixed with 20 grams of unmodified polystyrene granules. In the succeeding step of the operation, 400 grams of the granules polymerized as above, the 20 grams of granules containing the 1 gram of the equi-molar product were mixed with an additional 580 grams of untreated polystyrene granules in a tumbling barrel. The mixture was then extruded, chopped and injection molded under normal polystyrene molding conditions. The resulting moldings were similar in quality to those made in Example 1.

EXAMPLE 36

The procedure of Example 1 was repeated using the same weight of a so-called high impact polystyrene which was a plastic alloy of 85% polystyrene, 5% polybutadiene, 10% polyacrylonitrile in place of the pure polystyrene. The same quantity of the additive was incorporated. A control specimen was prepared in identical fashion with the exception that the additive was omitted. The two specimens were identical in appearance. Immediately after molding, the treated specimen showed a charge of 1 volt whereas the unmodified control specimen showed a charge of 18 volts.

EXAMPLE 37

80 grams of triisopropanolamine were incorporated in 5000 grams of the same polystyrene as employed in Example 1 by means of a sigma blade mixer. The mixing was done in ten small batches which were later combined and extruded in a Windsor RC-65 twin screw extruder in which the temperature of the mixer, barrel and die were held at 400° F., 400° F., and 375° F. respectively. ⅛" square strands were extruded which were then chopped into ⅛" pellets.

The pellets were tumbled in a 5 gallon baffled drum at 60 r.p.m. for 8 hours with 20 grams of the equi-molar product of triisopropanolamine and pelargonic acid. The resulting molded product produced excellent results when subjected to the dust test.

As has been pointed out in the foregoing experiments, the additives of this invention effect destaticization of polystyrene when used in very small quantities and with very slight decrease in the softening point of the polystyrene. However, it has been found that this destaticization is accompanied by a tendency to yellow on exposure to heat and humidity. This tendency increases as more and more carboxylic acid is added to the composition.

It has been found that the tendency toward yellowing can be substantially eliminated by the addition of a stabilizer such as bis (2-ethyl hexyl) hydrogen phosphite in quantities of 0.02% to 0.5% based on the synthetic resin. The lower limit is critical. The upper limit is not so critical and is primarily a matter of economics for other than clear moldings. When clear (unpigmented) moldings are desired, then a range of 0.02% to 0.06% is preferred.

While many different compounds are currently commercially available, as stabilizers for various materials against heat or oxidation, only a few have been found suitable for use as a stabilizer in combination with the destaticized molding compositions of this invention.

For example, tri (2-ethyl hexyl) phosphite and triisooctyl phosphite, both well known and highly recommended stabilizers for molding resins, have been found ineffective in preventing discoloration of the compositions of this invention when tested as in Example 38.

In general we have found that bis alkyl hydrogen phosphites in which the alkyl groups contain 1–12 carbon atoms and trihexyl phosphite have been found excellent for this purpose.

This is surprising in view of the fact that they are all alkyl phosphites and that the aforementioned recognized stabilizers previously used have proved to be unsatisfactory for the purposes of this invention.

Typical of the group of suitable stabilizers are the dimethyl, diethyl, dibutyl, bis (2-ethyl hexyl) and bis lauryl hydrogen phosphites. The latter material has proven to have a distinct ability to produce moldings of superior clarity when used in concentrations of 0.05% based on the weight of the resin present.

EXAMPLE 38

Two batches of resin were prepared in accordance with Example 1. In one batch there was introduced, with the additive, 0.2% by weight of the total batch of bis (2-ethyl hexyl) hydrogen phosphite.

A molding of each batch was prepared and subjected to the repeated cycling of temperature between 70° F. and 160° F. and relative humidity of 95% as called for by Military Standards 202, Method 106.

Under these conditions, the molding containing no stabilizer was yellowed after two days. The one containing stabilizer showed no significant discoloration after ten days.

EXAMPLE 39

Example 38 was repeated with the same weight of trihexyl phosphite substituted as the stabilizer. The resulting produce was found to be excellent when tested as in Example 38.

EXAMPLE 40

The procedure disclosed hereinafter is claimed in the copending application of Myron A. Coler and Arnold S. Louis entitled, "Process for Making Plastic Compositions," Serial No. 532,132 filed approximately September 2, 1955 and assigned to the assignee of this application.

In carrying out this process, 100 grams of the additive of Example 1 were dissolved in 500 grams of isopropyl alcohol. 4900 grams of polystyrene granules were added with continual agitation to make a total of 5000 grams of additive and polymer. The alcohol was then removed by evaporation in an exhaust oven at 65° C. for 36 hours with occasional agitation so as to leave the polymer granules uniformly coated with said additive.

The coated material was then fed through a Windsor type RC-65 twin screw extruder equipped with ⅛ inch square orifices. The die temperature was maintained at 375° F. while the two barrel temperatures were maintained at 400° F. The extruded material was then chopped up into the conventional sized molding granules.

The granules were then injection molded on a Reed-Prentice 8-ounce injection molding press with a heater temperature of 550° F. The resultant moldings exhibited destaticized properties similar to that obtained by the procedure of Example 1.

The products resulting from the combining of the aforementioned alkanolamines and acids have been found useful for diverse purposes. Specifically the product of triisopropanolamine and pelargonic acid has also been found suitable as a mold lubricant and release agent. For this purpose it has been convenient to periodically spray the mold faces so as to facilitate the ejection of completed moldings from the mold.

The destaticizing agents of this invention were found to be so effective when employed with polystyrene that prior standards of what constituted acceptable destaticization properties were found to be inadequate. For example, prior to this invention, a smudged coating of carbon dust on a white molding resulting from a standard test was generally considered excellent. With the introduction of this invention, it was found that dust free moldings were obtainable under the test.

The effectiveness of the destaticizing agent in polystyrene based compositions is of particular significance in that it is especially difficult to treat polystyrene to obtain truly destaticized products. For example, polyethylene which is moderately subject to the effects of electrostatic charging is rendered destaticized with only 1% of the destaticizing agent, of this invention. Moldings when tested in accordance with the standard tests show that with a 1% by weight concentration of destaticizing agent, polystyrene rated "good to excellent" whereas polyethylene was "excellent." It should be appreciated that this is not to be interpreted that the destaticizing agents of this invention are more effective with polyethylene than polystyrene. The actual situation is that a polyethylene control, one containing no additive, rates fair on the earlier described dust pickup test. Thus, while the effectiveness of a particular destaticizing agent in the highly sensitive polystyrene formulations may serve as an indication that the same material may be useful in other materials, the converse may not be true. For instance, a material useful in a polyvinyl resin as a destaticizing agent will not necessarily produce destaticization of polystryrene.

EXAMPLE 41

A mole to mole addition product of triisopropanolamine and pelargonic acid was formed as in Example 1. 4.5 g. of the addition product were added to 450 g. of polyethylene molding compound (Monsanto Chemical Company-"Orizon 705") plus 0.9 g. of a stabilizer, bis (2-ethyl hexyl) hydrogen phosphite, representing 0.2% by weight based on resin. Mixing was carried out by means of a sigma blade mixer. Extrusion was carried out on a Windsor twin screw extruder with all three temperatures of barrel and die held at 350° F. The extruded strands were chopped up into ⅛ inch chips. The chips were then injection molded under standard conditions for polyethylene (400° F). Moldings thereby produced registered 0 volts on the Keithley voltmeter when tested after ejection and rated excellent on dust pickup. The moldings were clear in appearance. An unmodified polyethylene control molding rated fair on dust pickup.

EXAMPLE 42

Example 1 was repeated using 9 grams of the mole to mole triisopropanolamine pelargonic acid addition product and 900 grams of polyvinylchloride. The temperatures of the extruder barrels and dies were held at 375° F. Molding was carried out at 400° F. Under the dust test, the resultant moldings were rated good whereas an unmodified control rated poor.

EXAMPLE 43

The procedure of Example 1 was repeated using 9 grams of the same mole to mole addition product and 450 grams of polychlorotrifluoroethylene. All extruder and molding temperatures were increased to 500° F. An unmodified control molding was poor on the dust test whereas the modified molding was fair.

EXAMPLE 44

Example 1 was repeated using 500 grams of polymethylmethacrylate as the resin. The extruder and molding temperatures were maintained at 400° F. The resulting molding was found to be "fair to good" whereas a corresponding unmodified control molding was unsatisfactory.

The destaticizing agents of this invention may be incorporated in any of the following thermoplastic resin molding compositions:

Polyethylenes; polypropylenes; polyacrylics, such as polymethyl-, polyethyl-, polybutyl-, and polyethylhexyl-, methacrylates, modified acrylics such as halogenated acrylates and polyacrylonitrile; polyamides such as nylons and modified nylons; polybutadienes; polyvinyl halides such as polyvinylidenechloride, polytetrafluoroethylene, polytrifluoromonochloroethylene and polyvinylchloride; and polyvinylacetate.

The term "vinylidene" as used herein is intended to define monomers containing a polymerizable $CH_2=C<$ structure and is generic to vinyl and vinylidene monomers. Each of the polymers specifically exemplified in the preceding examples is a polymer of a vinylidene monomer, so defined.

It is to be understood that compatible mixtures of the resin polymers commonly referred to as plastic alloys, may be employed.

The mixture may be accomplished by simple mechanical incorporation, as by extrusion of the polymers or by copolymerization of the monomers.

It has been found that mixtures of the various disclosed antistaticizing additives may be employed providing that the total quantity employed is within the disclosed proportions for a single specie thereof.

Thus in accordance with the statutes there have been described herein certain embodiments of this invention in some detail.

What is claimed is:

1. A molding composition comprising polymer of a vinylidene monomer and between 0.5% and 10% by weight of said polymer of an additive effective to destaticize articles molded from said additive-containing polymer, at least 0.5% of said additive consisting of the product resulting from reacting equimolar quantities of an alkanolamine and an aliphatic carboxylic acid, at temperatures below about 65° C.; and the remainder of said additive consisting of material selected from the group consisting of free alkanolamine and free carboxylic acid, there being no free acid present if free alkanolamine is present and there being no free alkanolamine present if there is free acid present; the alkanolamines in the foregoing being selected from the group consisting of alkanolamines by the general formula

wherein R is monoalkanol, and R' and R'' are each selected from the group consisting of -H, -alkyl, and -monoalkanol; there being from 1 to 8 carbons in any alkyl and alkanol groups present and not over 12 carbon atoms in all of said groups and the carboxylic acid being selected from the group consisting of alkyl monocarboxylic acids having 6 to 12 carbon atoms in the molecule, the additive consisting of no more than 99.5% by weight of free alkanolamine when present and no more than 70% by weight of free carboxylic acid when present.

2. The composition of claim 1 wherein said alkanolamine is triisopropanolamine.

3. The composition of claim 1 wherein said acid is pelargonic acid.

4. The composition of claim 1 wherein said acid is caproic acid.

5. The composition of claim 1 wherein said acid is undecylenic acid.

6. The composition of claim 1 wherein said acid is lauric acid.

7. The composition of claim 1 wherein said acid is octanoic acid.

8. The composition of claim 1 wherein the amount of additive is between 3% and 6% by weight of the polymer.

9. The molding composition of claim 1 wherein said polymer is polystyrene.

10. The composition of claim 9 wherein said acid is undecylenic acid.

11. The composition of claim 9 wherein said acid is caproic acid.

12. The composition of claim 9 wherein said acid is pelargonic acid.

13. The composition of claim 9 wherein said acid is lauric acid.

14. The composition of claim 9 wherein said acid is octanoic acid.

15. The process of making destaticized thermoplastic synthetic resin molding compositions comprising the steps of mixing from 1 to 100 parts by weight of triisopropanolamine with at least one part by weight of carboxylic acid, selected from the group consisting of alkyl monocarboxylic acids having from 6 to 12 carbon atoms in the molecule, while maintaining the temperature thereof below 65° C. so that the resulting mixture contains from 0.5% to 100% of the resulting combined triisopropanolamine-acid reaction product, and depending on whether the acid or amine is in excess, at least one member selected from the group consisting of 0% to 99% by weight of free triisopropanolamine and from 0% to 70% of free carboxylic acid and incorporating from 1 to 20 parts of said resulting composition with thermoplastic synthetic resin polymer of a vinylidene monomer, to make a total of 200 parts of said molding composition.

16. The process of making a destaticized synthetic resin molding composition comprising the steps of incorporating into synthetic resin selected from the group consisting of polymers of vinylidene monomers, from 1% to 10% by weight of said resin of a free alkanolamine having from 1 to 8 carbon atoms in the molecule, comminuting said resin, and coating said resulting comminuted particles with the reaction product resulting from the combining, under conditions avoiding the heating of the constituents above 65° C. of (1) an alkylalkanolamine represented by the general formula

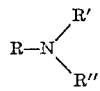

wherein R represents a monoalkanol group and R' and R'' each represent a member selected from the group consisting of hydrogen, alkyl and monoalkanol, there being from 1 to 8 carbon atoms in each of said alkyl and alkanol groups and the sum of the carbon atoms in the alkanolamine molecule, is not greater than 12; with (2) carboxylic acid selected from the group consisting of alkyl monocarboxylic acids and having 6 to 12 carbon atoms in the molecule, said alkanolamine and said carboxylic acid being combined in equimolar proportions.

17. The process of claim 15 wherein said resin is polystyrene.

18. The process of claim 16 wherein said free alkanolamine is introduced in said resin by the polymerization of the monomer of said resin in the presence of said alkanolamine.

19. The process of claim 16 wherein said free alkanolamine is introduced in said resin by combining them in an extruder.

20. The product formed by reacting tri-isopropanol amine and pelargonic acid in equimolar proportions while maintaining the temperature below 65° C.

References Cited in the file of this patent
UNITED STATES PATENTS

| | | |
|---|---|---|
| 2,067,219 | Whitehead | Jan. 12, 1937 |
| 2,144,552 | Shonle | Jan. 17, 1939 |
| 2,250,664 | Watkins | July 29, 1941 |

(Other references on following page)

UNITED STATES PATENTS

| | | |
|---|---|---|
| 2,271,468 | Watkins | Jan. 27, 1942 |
| 2,278,499 | Smith et al. | Apr. 7, 1942 |
| 2,287,188 | Matheson et al. | June 23, 1942 |
| 2,403,960 | Stoops et al. | July 16, 1946 |
| 2,460,600 | Sarbach | Feb. 1, 1949 |
| 2,726,226 | Werkheiser | Dec. 6, 1955 |
| 2,754,305 | Wolff | July 10, 1956 |
| 2,772,967 | Padbury et al. | Dec. 4, 1956 |
| 2,773,852 | Rowe et al. | Dec. 11, 1956 |
| 2,859,189 | Fallon et al. | Nov. 4, 1958 |
| 2,860,115 | Hecker et al. | Nov. 11, 1958 |
| 2,867,594 | Hansen et al. | Jan. 6, 1959 |
| 2,868,745 | Caranois | Jan. 13, 1959 |
| 2,885,441 | Zenitz | May 5, 1959 |

FOREIGN PATENTS

| | | |
|---|---|---|
| 882,915 | France | Mar. 8, 1943 |
| 635,011 | Great Britain | Mar. 29, 1950 |

OTHER REFERENCES

Bovey et al.: Emulsion Polymerization, page 22, Interscience (1955).